R. B. CRAIG & A. COFFMAN.
AUTOMATIC VENDING MACHINE.
APPLICATION FILED NOV. 30, 1908.

987,701.

Patented Mar. 28, 1911.
11 SHEETS—SHEET 2.

Fig. 2

R. B. CRAIG & A. COFFMAN.
AUTOMATIC VENDING MACHINE.
APPLICATION FILED NOV. 30, 1908.

987,701.

Patented Mar. 28, 1911.
11 SHEETS—SHEET 4.

Fig. 4.

Witnesses
C. K. Reichenbach
Ida J. Stanley

Inventors:
Robert B. Craig, Albert Coffman
By Knight Bros
Attorneys

R. B. CRAIG & A. COFFMAN.
AUTOMATIC VENDING MACHINE.
APPLICATION FILED NOV. 30, 1908.

987,701.

Patented Mar. 28, 1911.
11 SHEETS—SHEET 7.

R. B. CRAIG & A. COFFMAN.
AUTOMATIC VENDING MACHINE.
APPLICATION FILED NOV. 30, 1908.

987,701.

Patented Mar. 28, 1911.
11 SHEETS—SHEET 8.

WITNESSES
O. K. Reichenbach.
Ida J. Stanley.

INVENTORS:
Robert B. Craig, Albert Coffman.
Knight Bros
Attorneys.

R. B. CRAIG & A. COFFMAN.
AUTOMATIC VENDING MACHINE.
APPLICATION FILED NOV. 30, 1908.

987,701.

Patented Mar. 28, 1911.
11 SHEETS—SHEET 9.

WITNESSES
C. K. Reichenbach
Ida J. Stanley

INVENTORS:
Robert B. Craig & Albert Coffman,
Knight Bros
Attorneys.

R. B. CRAIG & A. COFFMAN.
AUTOMATIC VENDING MACHINE.
APPLICATION FILED NOV. 30, 1908.

987,701.

Patented Mar. 28, 1911.
11 SHEETS—SHEET 10.

WITNESSES
C. K. Ruchenbach
Ida J. Stanley

INVENTORS:
Robert B. Craig & Albert Coffman
Knight Bros
Attorneys

R. B. CRAIG & A. COFFMAN.
AUTOMATIC VENDING MACHINE.
APPLICATION FILED NOV. 30, 1908.

987,701.

Patented Mar. 28, 1911.
11 SHEETS—SHEET 11.

WITNESSES
E. K. Reichenbach
Ida J. Stanley

INVENTORS:
Robert B. Craig & Albert Coffman,
Knight Bros.
Attorneys.

UNITED STATES PATENT OFFICE.

ROBERT B. CRAIG AND ALBERT COFFMAN, OF KANSAS CITY, MISSOURI, ASSIGNORS TO AUTOMATIC VENDING MACHINES COMPANY, OF KANSAS CITY, MISSOURI, A CORPORATION OF THE TERRITORY OF NEW MEXICO.

AUTOMATIC VENDING-MACHINE.

987,701.     Specification of Letters Patent.     Patented Mar. 28, 1911.

Application filed November 30, 1908. Serial No. 465,182.

*To all whom it may concern:*

Be it known that we, ROBERT B. CRAIG and ALBERT COFFMAN, citizens of the United States, residing at Kansas City, in the county of Jackson and State of Missouri, have invented certain new and useful Improvements in Automatic Vending-Machines, of which the following is a specification.

While some of the features of the present invention are applicable to vending machines in general, the machine as a whole, and some of the features in particular, are designed for the purpose of vending a paper article, such for instance as an insurance policy. In selling articles of this kind by vending machine, it is necessary to properly record the time of sale; one part of the present invention, therefore, consists in certain novel relations between the time-piece and time-recording means, as well as certain details in the construction of means for establishing such relations, and in the construction of these elements, *per se*.

It is also desirable in machines of this class to supply the insurance policy or other paper commodity to be sold, from a continuous web of paper upon which the time of sale may be recorded and to have on the policy sold, in addition to the time record, certain other data necessary to express a contract or other information, which is common to all the articles sold; another feature of the invention therefore relates to means for supplying blanks from a continuous roll, upon which blanks are imprinted the portions of the matter common to all the sales with spaces to receive the identifying matter peculiar to the particular sale; also means for insuring the impression of the identifying matter at the proper points in the form; also means for severing the completed article at the proper point.

It is also desirable in machines of this type to have automatic means for operating the several parts of the machine and to have these means in such shape that they will require a minimum amount of attention and will operate with certainty during at least a predetermined period; another feature of the invention, therefore, consists in providing operating motors for the recording and for the delivering elements of the machine and in having the motors for the recorder whose service is measured by the lapse of time independent of the motor for actuating the delivery mechanism whose service is variable according to the patronage of the machine by the purchasing public. This portion of the invention further consists, in addition to the features named, in having the delivery motor actuated by the weight of the purchaser upon a platform.

It is of great importance, in a machine exposed for the purpose of inviting expenditure of money to insure reliability of action and reduce to the minimum the danger of failure to deliver that for which the coin is inserted; another feature of the invention, therefore, relates to a simple and efficient coin release device and locking means controlled thereby which enable the machine to resist operation even under the weight of a purchaser, yet to promptly release the mechanism by the impact of coin.

The novel features of the invention will be fully described, in the order in which they are above referred to, reference being had to the accompanying drawings forming part of this specification, in which:

Figure 4:
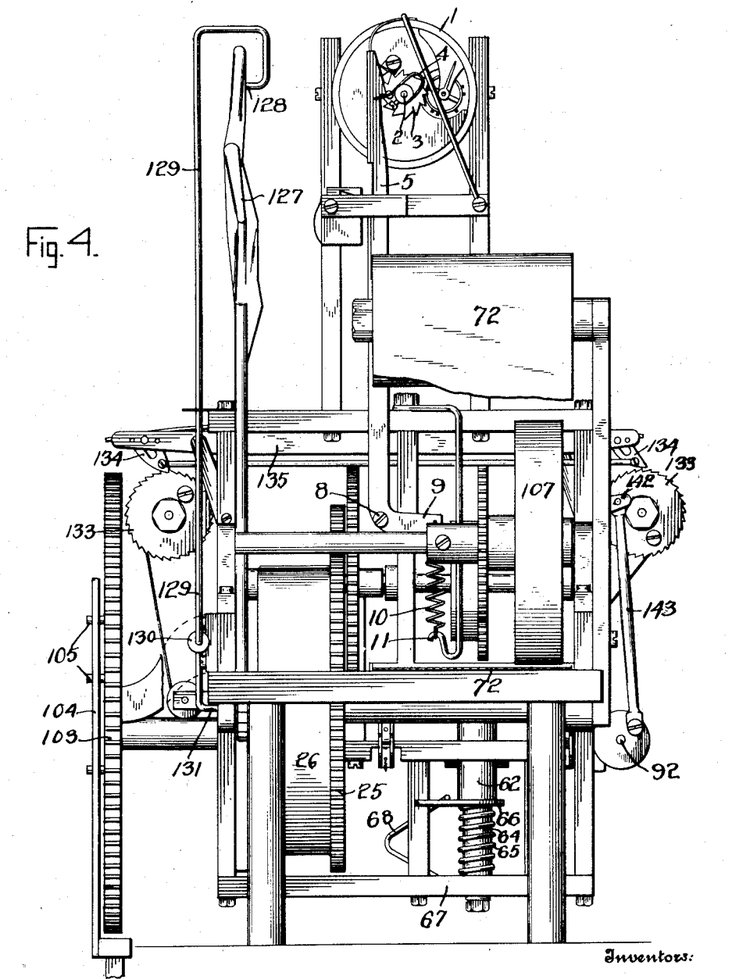
Fig. 4 is a rear elevation.
Figure 16:
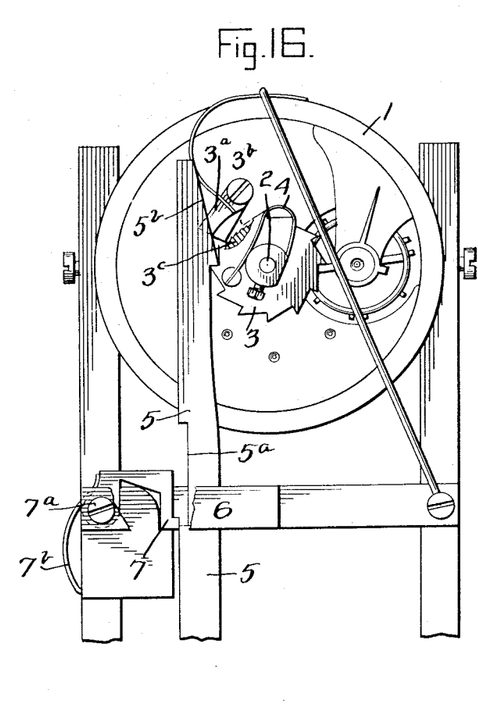
Fig. 16 is a detail view of the time mechanism.

*Timing mechanism.*—This element of the mechanism controls by releasing rather than actuating the recording mechanism, and exercises this control through the medium of a detent-restraining mechanism that is under constant tension, and releases such detent through a connection that is under constant tendency to move in the direction of releasing, so that the time piece restrains rather than imparts the movement. The force thus resisted is utilized to actuate the time piece and being a constant load, it is possible to obtain accurate results with very simple and cheap construction of time mechanism. To accomplish these ends, the time piece 1 carries loosely upon its minute arbor 2 a wheel 3 having driving connection with said arbor through a short spring 4. Wheel 3 is provided with ratchet teeth that are twelve in number and therefore have the value of five minutes each. Supported by wheel 3 is a gravitating or spring-assisted drop bar 5, which is lowered a distance of one tooth every five minutes, and when so lowered, is in position to slide off the tooth and at the same time is free to move laterally in its guide 6 so that it may drop and release the escapement of the recording mechanism, and permit the latter, as hereinafter described, to advance a distance corresponding to five minutes. The guide 6 contains a pivoted chock 7 that normally engages the thicker portion of the bar 5 and prevents the latter moving sidewise out of engagement with the wheel 3. But when wheel 3 has rotated under the advancement of the clock mechanism, a distance sufficient to bring the recess $5^a$ opposite the chock 7, the sidewise movement of the bar 5 necessary to release the bar is permitted. When bar 5 has performed its function by dropping, and is returned upward by a force to be described, chock 7 is engaged by the lower shoulder of the recess $5^a$ and is swung upon its pivot $7^a$ in opposition to spring $7^b$. This permits the bar 5 to be deflected sidewise by its beveled end $5^b$ in riding over the next tooth of the wheel 3. (See Fig. 16.) As shown in Fig. 4, bar 5 is fulcrumed at 8 and has a crank arm 9 connected by a spring 10 with a fixed point 11. This causes the bar to swing to the left as soon as its engaging notch passes the next tooth upon the wheel 3, and as soon as this bar resumes its normal position, which is that shown in Fig. 16, chock 7 swings back to its limiting position under the influence of its spring $7^b$. As will be seen from Figs. 4 and 5, the fulcrum 8 is the means for connecting the bar 5 to the escapement lever 12, so that when bar 5 drops, it depresses said lever 12. The downward tendency of bar 5 is assisted by the spring 10, so that in addition to its weight, and that of the lever 12, the rotation of the wheel 3 is influenced by said spring 10. In order that the time-piece may continue under the influence of driving energy during the interval when the bar is down, or released from the wheel 3, a dog $3^a$ pivoted at $3^b$ on a fixed part and engaging a ratchet wheel $3^c$ on the wheel 3, prevents retrograde of the wheel 3, and inasmuch as the tension on the spring 4 is commensurate with the load imposed by the bar 5, it is obvious that the driving energy upon the arbor 2 in the interim when bar 5 is disengaged, will be substantially equal to the driving energy when the bar is in engagement.

Figure 1:
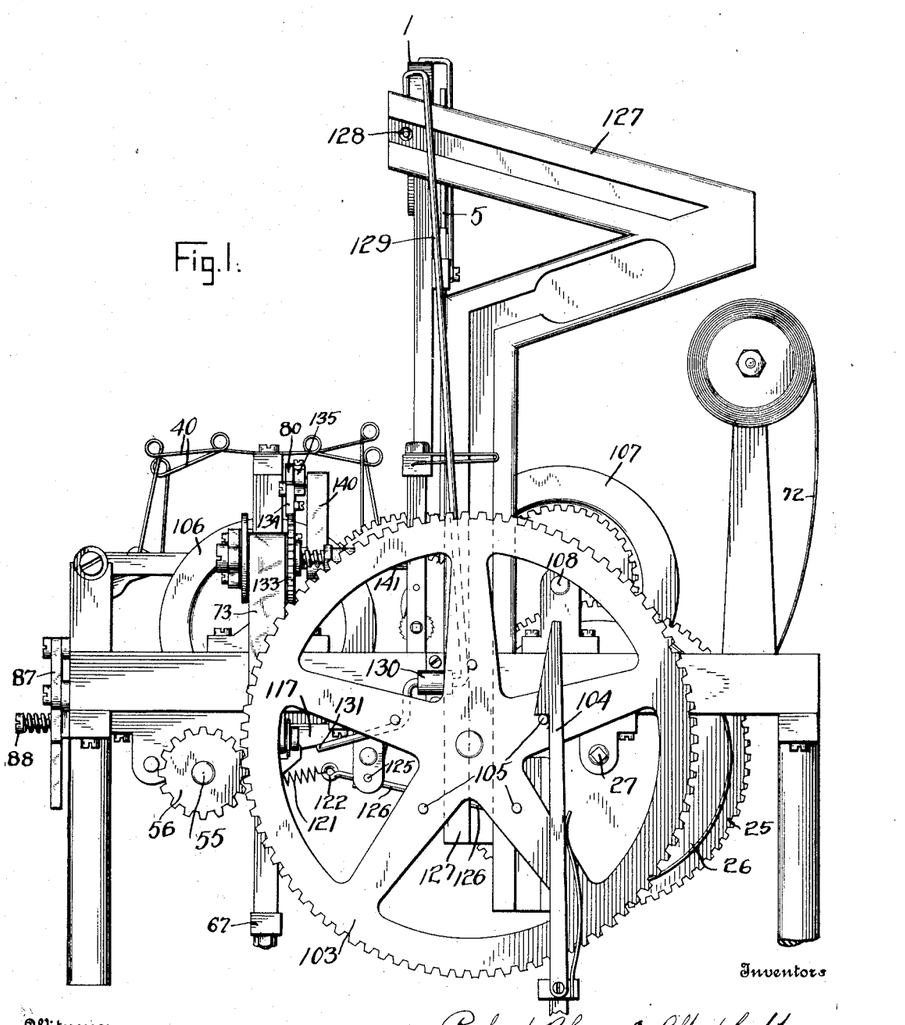
Figure 1 is a view in elevation of the right-hand side of the machine.
Figure 2:
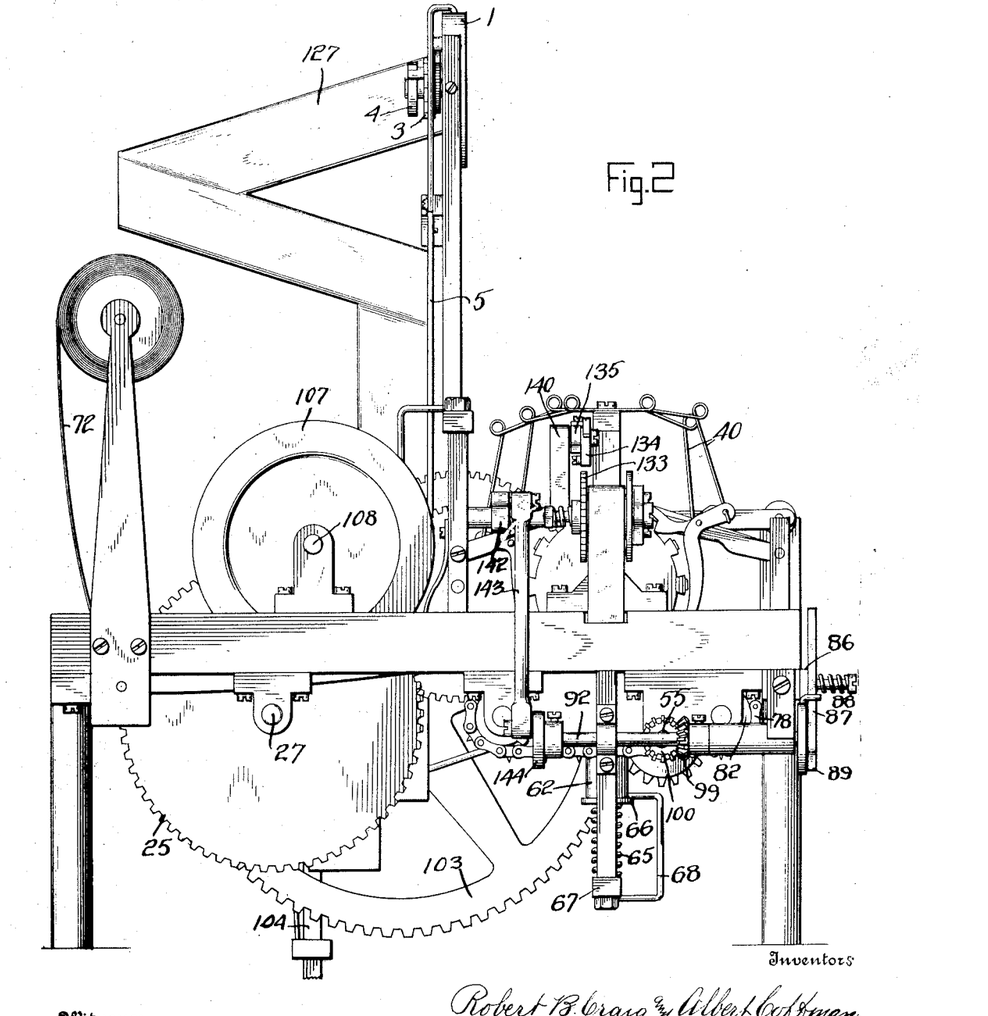
Fig. 2 is a view in elevation of the left-hand side of the machine.
Figure 5:
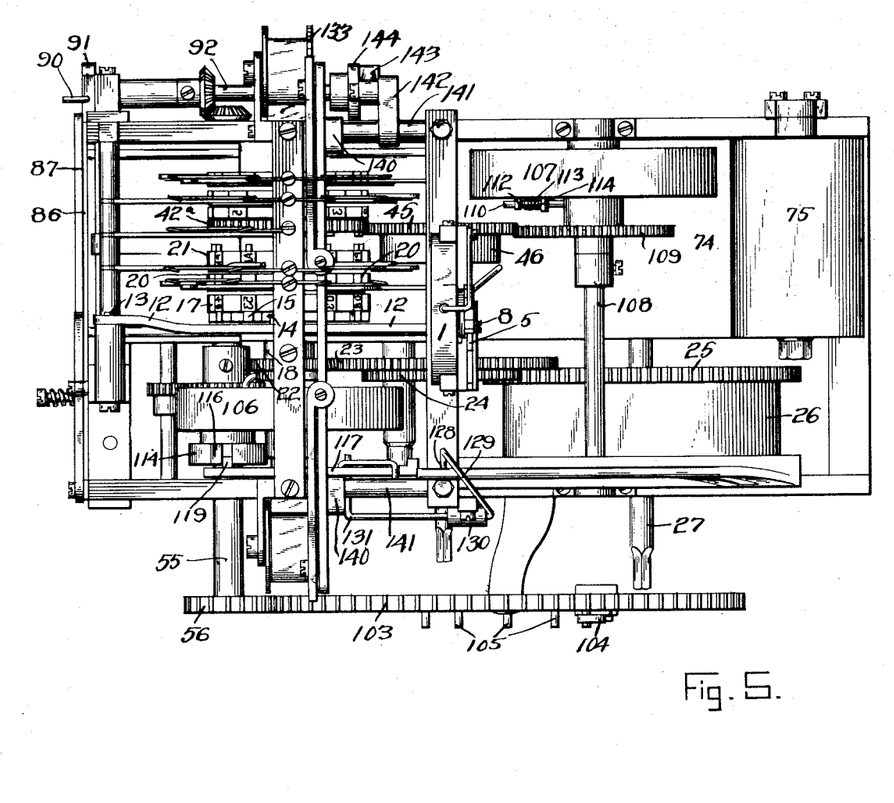
Fig. 5 is a top view.
Figure 9:
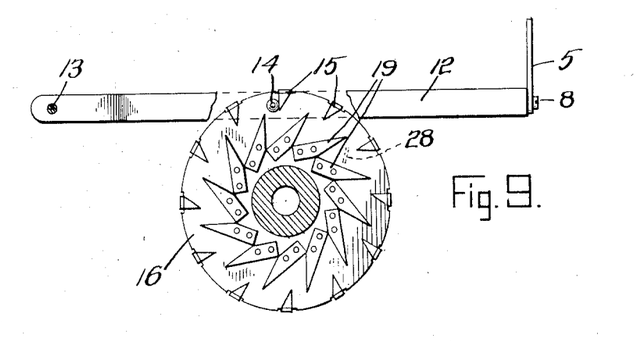
Fig. 9 is a detail view of the escapement of the time-recording mechanism, released at predetermined intervals by the time mechanism.

*Time recorder escapement.*—By referring to Figs. 1, 5 and 9, it will be seen that the escapement lever 12 is pivoted at 13 and carries a stop 14 normally in the path of segmental stops 15 of which there are twelve arranged around the face of the escapement wheel 16 carried by the minutes wheel 17 of the time recording mechanism. Said time recording mechanism, as will be hereinafter described, has its first wheel together with the escapement wheel 16, fixed against rotation upon a shaft 18 which is subjected to constant driving force, as will also be described. Wheel 16 is further provided with intermediate deflecting cams 19, which, as soon as the stop 14 is depressed from the path of a segmental stop 15, engage said stop 14 and throw it up into the path of the next segmental stop 15. The cams 19 thus become the means for returning lever 12 to its normal position, and in performing this function, they also restore the drop bar 5 to its upper position.

Figure 3:
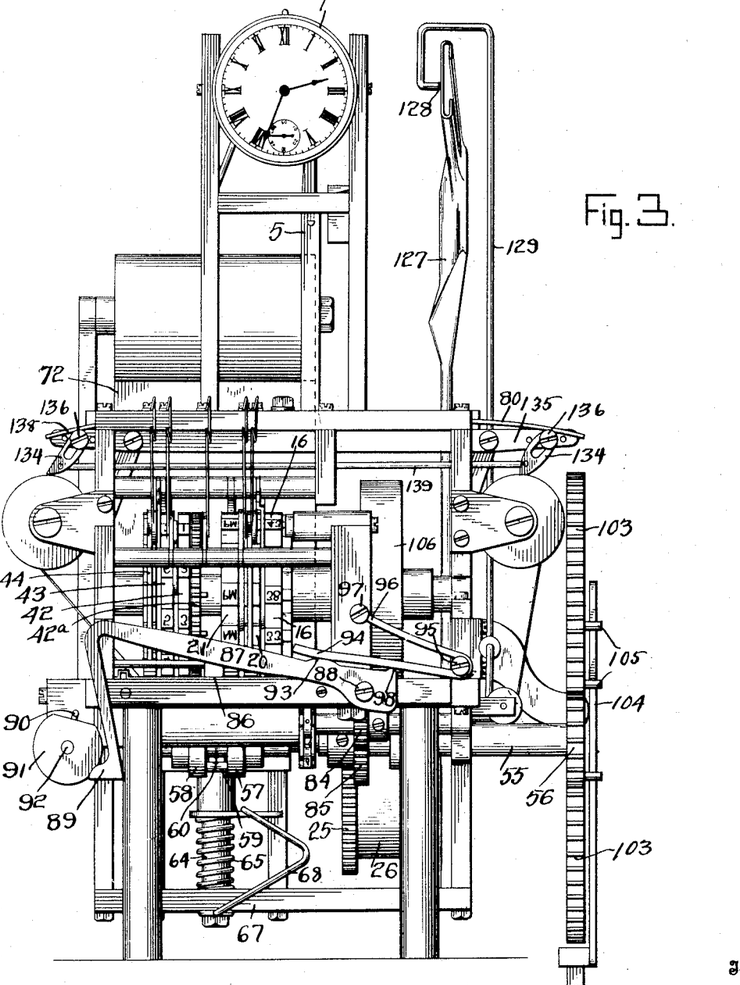
Fig. 3 is a front elevation.

*Recording mechanism.*—As will be seen upon reference to Figs. 3 and 5, the recording mechanism is divided into two sections, one of which serves as a time recording means and the other as a date recording means; that is to say, one section records divisions of twenty-four hours, while the other section records divisions of a year. As will hereinafter appear, these two recording means are preferably, though not necessarily, provided with independent driving motors. It will also appear hereinafter that notwithstanding their independent drive, these two sections of recording means are dependent in action; that is to say, not only are the successive wheels of the time recording means driven *seriatim*, so as to shift every five minutes and thus be in condition to record within five minutes of the exact time of any sale, but the last wheel of the time series, after having completed a revolution corresponding to twenty-four hours, releases a detent that permits a movement of one step in the dating series so as to change the day.

Figure 10:
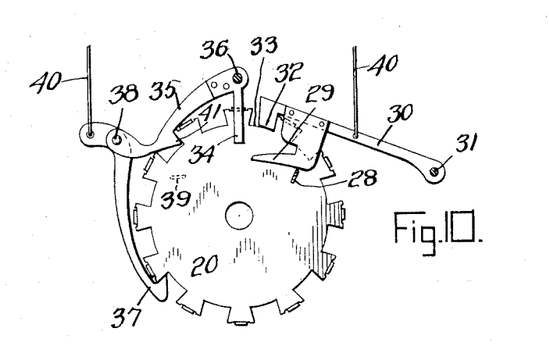
Figs. 10 and 11 are detail views of two symmetrically constructed but oppositely disposed dogging and feeding mechanisms, by means of which printing wheels in the time-recording mechanism are normally held in fixed position, but released and caused to move one step by a preceding wheel in the series when the latter completes a revolution.
Figure 11:
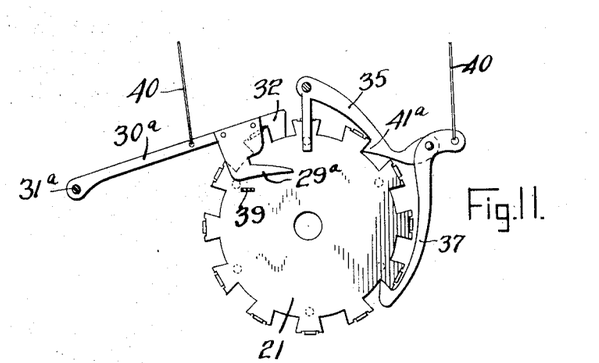

*Time recorder.*—As will be seen from Figs. 3 and 5, the time recorder comprises the minutes wheel 17, the hours wheel 20 and the meridian wheel 21. As has already been stated, the minutes wheel 17 is fixed relatively to the escapement wheel 16 and also fixed upon the shaft 18 which is driven through multiplying gear 22, 23 and 24, from the toothed wheel 25 of the spring drum 26, which may be wound through arbor 27. Wheel 17 is thus under constant tendency to rotate, but is normally restrained by the escapement wheel 16, which is controlled by the time mechanism, as already described. Wheel 17 carries upon its periphery, twelve printing characters, indicating times five minutes apart. These times may be arbitrarily selected, so long as they bear the proper relation and thus adapt the wheel to indicate within five minutes the exact minute of sale; but it is preferred to commence the series at a point other than the exact meridian, which would necessitate the use of an extra wheel to distinguish between 12 o'clock noon and 12 o'clock midnight; thus the series commences at .03 minutes and runs thence .08, .13, .18, etc. As will be seen from Figs. 9 and 10, the minutes wheel carries on its face opposite the escapement a projection 28 (shown in dotted lines in Fig. 9 and shown separated from the wheel that carries it in Fig. 10), located at such radial distance from the center of the wheel as will cause it to engage the horn 29 on a detent 30 once in each revolution of the minutes wheel 17, and swing said detent 30 upon its fulcrum 31 in order to remove its end 32 from notch 33 of the hours wheel 20 and render said hours wheel free to rotate. Continuing in its travel, projection 28, before it drops detent 30, strikes the operating arm 34, of bell crank lever 35 fulcrumed at 36 and carrying a lifting dog 37 pivoted at 38 to the bell crank lever, and adapted to engage in the peripheral notches of the wheel 20. Wheel 17, in thus engaging arm 34, through the medium of projection 28, imparts rotation to the wheel 20. This takes place when the wheel 17 completes the last step of its complete revolution, or when it moves from a position in which it presents .58 minutes at the printing point to the position in which it presents .03 minutes at the printing point, and in doing this, it effects one step in the revolution of wheel 20 and brings the next hours designation of the last-named wheel into the printing position. On that face of the wheel 20 remote from the wheel 17 is a projection 39 (shown in dotted lines in Fig. 10 and in section in Fig. 11), which acts in all respects similarly to the projection 28 in establishing driving connection between the hours wheel 20 and the meridian wheel 21, that is to say, engages beneath a horn 29$^a$ on a detent 30$^a$, fulcrumed at 31$^a$ and having an engaging end 32$^a$, and after lifting said detent, said projection 39 engages the bell crank lever 35$^a$, which carries the lifting dog 37$^a$ and thereby imparts one step in the revolution of the wheel 21. The periphery of wheel 21 may contain any suitable number of printing surfaces, but these are provided with the characters A. M. and P. M., for designating the meridian of the hour printed by the hours wheel. These meridian designations are alternately arranged, so that each time the hours wheel completes a revolution equal to twelve hours, the meridian will be changed from A. M to P. M., or vice versa. As already stated, five-minute intervals are so selected that no time designation will ever coincide with noon or midnight, and thus it is unnecessary to have an additional designation for this purpose. To return the detents 30, 30$^a$, and the lifting dogs 37, 37$^a$, to normal positions, depressing springs 40 are provided. Those springs 40 which act upon the lifting dogs, are connected with the latter at points beyond their fulcrums, and thus serving the double purpose of throwing the dogs into engagement with the wheels and depressing the bell crank levers 35. To prevent movement of the wheels 20 and 21 beyond a distance of one step, the levers 35, 35$^a$ are provided with arresting stops 41, 41$^a$.

*Dating means.*—The date is expressed, not by months and days of the month, but by the ordinal numbers of the days in the year; thus number 1 associated with the word "Year", previously printed upon the blank, will indicate that the policy was sold on the first day of the year, or January 1st; while the number 60 would indicate the first day of March in a common year, or the 29th day of February in a leap year. It is thus necessary to have but three wheels to indicate the day of the year, each of which carries the nine digits together with the zero, so that by proper composition of the three wheels, any day from 1 to 365 or 366 may be expressed.

Figure 12:
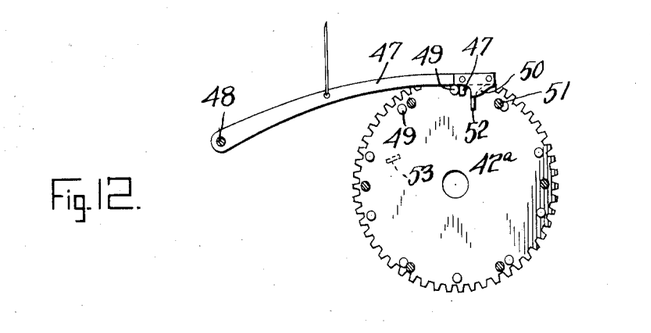
Fig. 12 is a detail view of the escapement of a motor-driven gear wheel that actuates a second series of recording wheels utilized to date the article sold, which escapement is under the control of the time recording means.
Figure 13:
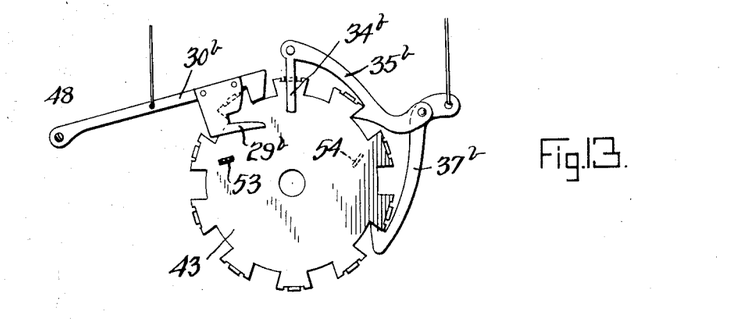
Figs. 13 and 14 are detail views showing the detent and advancing means for the second and third wheels in the dating series.
Figure 14:
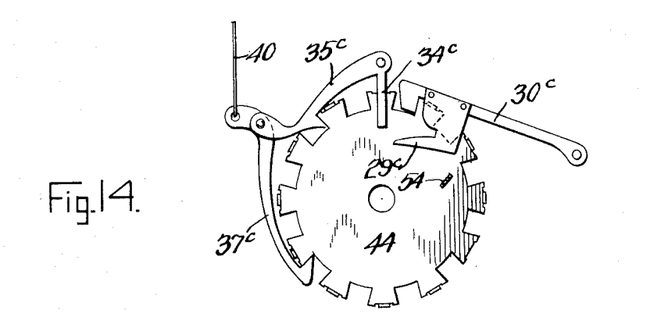

As will be seen from Figs. 3 and 5, the dating means comprises a units wheel 42, having a toothed driving pinion 42$^a$, a tens wheel 43, and a hundreds wheel 44. Wheel 42$^a$ is driven by pinion 45 of the spring drum 46, so that it is under constant tendency to rotate with its rigidly connected units wheel 42. To restrain this rotation except at proper intervals, wheel 42ᵃ is provided with a detent 47 (Fig. 12), pivoted at 48, engaging, successively, pins 49 arranged upon the face of the wheel 42ᵃ, so as to prevent rotation of the latter from the influence of the spring drum 46; also a cam face 50 that is in the path of a series of pins 51 (shown in dotted lines in Fig. 11 and in section in Fig. 12) on the opposed face of the last wheel 21 of the time recorder; also an intermediate arresting stop 52 which rises in the path of the pins 49 each time the detent 47 is raised by a pin 51, and prevents wheel 42ᵃ with its connected units wheel 42 from rotating more than a single step. Cam 50 and intermediate stops 52 are in different planes, the former being in the plane of the pins 51 carried by meridian wheel 21, while the latter being in the same plane as the normal stop of detent 47, which is in the path of the pin 49 on the wheel 42ᵃ. Thus the rotation of wheel 21, displaces stop 47 from a pin 49, and wheel 42ᵃ rotates until pin 49 strikes the intermediate stop 52, whereupon lifting pin 51 passes beyond the cam 50 and drops the stop 47 which permits pin 49 to escape from intermediate stop 52, passing through the recess above stop 52, and thus permitting completion of the step or the rotation of wheel 42ᵃ until the next pin 49 comes against the normal stop 47. Inasmuch as there are several designations of each meridian on the wheel 21, the displacing pins 51 are also several in number, there being one for each two meridians on the meridian wheel; thus whenever an A. M. and a P. M. designation have passed printing point, a pin 51 will permit movement of one step in the units wheel of the dating means. On that face of the dating means that is remote from the last wheel of the time recorder is a projection 53 (shown in dotted lines in Fig. 12 and in section in Fig. 13), which is in position to release or actuate detent and shifting means applied to the tens wheel of the dating means in the same manner as described with reference to the second and third wheels of the time recorder; that is to say, projection 53 engages horn 29ᵇ of detent 30ᵇ to release the tens wheel 43 and then engages the arm 34ᵇ of bell crank lever 35ᵇ which carries the lifting dog 37ᵇ, and by these means moves the wheel 43 one step. As there is but one projection 53 on the wheel 42, this action takes place only at the completion of the revolution of the units wheel, or in the movement of the units wheel by which it brings the zero into the printing position so that in composition with the digit on the tens wheel, it prints 10, 20, etc. In like manner, the tens wheel 43 of the dating means is provided with a projection 54 (shown in dotted lines in Fig. 13 and in section in Fig. 14) which is adapted to engage the horn 29ᶜ of detent 30ᶜ and the arm 34ᶜ of bell crank lever 35ᶜ, and thus lift the dog 37ᶜ to move wheel 44 one step as the tens wheel completes its revolution. The escapement stop 47, as well as the stops 30ᵇ and 30ᶜ and the dogs 37ᵇ and 37ᶜ are provided with depressing springs 40 identical in construction and effect with the springs 40 already described with reference to Figs. 10 and 11.

Figure 15:
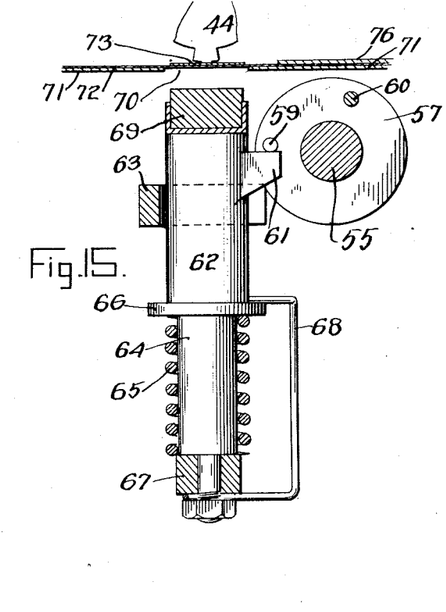
Fig. 15 is a detail view of the printing platen and the means for imparting a double impulse thereto at each operation of the machine.

*Printing mechanism.*—It has been seen how the printing characters arranged upon the peripheries of the several wheels of the recording mechanism are composed for the purpose of expressing a date (by the ordinal number of the day in the year) and the time or fraction of the day by hours and five-minute intervals. This composition of printing characters takes place vertically beneath the shaft 18 upon which the disks or wheels are mounted. In order to produce impressions from these printing characters, upon the policy or other paper article vended, a shaft 55 (Figs. 1, 2, 3, 5, 6 and 15) adapted to be driven one revolution for each article to be vended, by any suitable means, such for instance as a pinion 56 driven as hereinafter described, is provided with a pair of disks 57, 58 (Figs. 3, 6 and 15) having oppositely projecting pins 59 and 60, while a lug 61 carried by a plunger 62 guided in bearing 63 and vertically movable upon a post 64, projects into the path of the pins 59, 60 so as to be depressed by the pins, successively, as shaft 55 rotates. Plunger 62 is held normally upward by a spring 65 which surrounds the post 64 and is confined between the flange 66 on the plunger 62 and a fixed bar 67 forming a part of the machine frame. Each time plunger 62 is depressed by a pin 59 or 60 and thereafter released by the pin passing out of the path of the lug, spring 55 throws the plunger upward. A resilient stop 68 arrests the plunger slightly below the upper limit of the plunger's stroke, but this top yields sufficiently to permit the plunger to reach the limit of its stroke under its own inertia developed by the spring 65. The plunger carries a cushioning block or platen 69 at its upper end, which works through an opening 70 in bed-plate 71 and forces the web 72 of paper together with the interposed inking ribbon 73 against the printing surface made up of the characters on the recording wheels. One of these wheels (44) is shown in Fig. 15. By the resilient stop 68, the platen is kept a sufficient distance from the paper web to permit the latter to remain out of contact with the interposed ribbon, except at the instant of making the imprint. Inasmuch as there are two pins 59 and 60 which successively engage a lug 61 and depress the plunger during a single revolution of shaft 55, two imprints are made during each revolution. This is of special advantage in the sale of articles which involve two parts requiring identical markings, such as the date and time to be placed upon each part of an insurance policy. Inasmuch as the imprint is effected by the action of spring 65, the strength of which may be predetermined at will, it is obvious that the impressions will be uniform. Moreover, the rebounding of the platen so reduces the duration of contact between the paper and the ribbon that the feed of the paper may take place during the printing operation without interruption or without causing objectionable blur.

*Feeding and delivering mechanism.*—The paper 74 is fed from a roll 75 suitably supported upon the machine and passes over the bed plate 71 until it receives its impressions, after which it passes beneath a confining plate 76 which prevents the paper buckling when the finished policy is cut off, as will be hereinafter explained. Plate 71 is recessed as shown at 77 in Fig. 6, to admit endless chains 78 having spurs 79 that puncture or extend through marginal perforations in the paper in order to feed the latter at a predetermined rate and to a certain extent. Chains 78 travel around idlers 80 on a shaft 81 and driving sprockets 82 on the shaft 83 which is geared through pinions 84 and 85 to the shaft 55. These chains are identical in construction, and by intermeshing with the opposite margins of the paper insure a straight positive and limited movement to the paper. This is important in view of the fact that in selling an article in the nature of an insurance policy, the paper web is printed in advance to provide forms containing the main portions of the contract with spaces in which to fill other data necessary to complete the contract. By the described feeding means, forms will always be presented in the proper relation to receive the distinguishing imprint and to be severed from the paper web on the proper lines of division. In the construction described, the travel imparted to the feed chains by the gears 84, 85 from the shaft 55 is accurately measured so as to advance a single blank with each revolution of the shaft 55. It has already been seen that one revolution of the shaft 55 produces two imprints upon the blank being fed through.

*Severing device.*—The paper web emerges at the front of the machine where it passes over the fixed blade 86, of a severing device comprising, in addition to said fixed blade, a knife 87, fulcrumed at 88 and having a foot 89 depending from its free end into the path of a pin 90 carried by a disk 91 rotating with shaft 92. Knife 87 is constructed with a bearing 93 that receives the end of a spring 94, supported at 95 and tensioned by its end 96 secured at 97. When disk 91 rotates in the direction of the arrow shown therein to bring the pin 90 beneath the foot 89 and elevate said foot until the pin 90 passes from beneath it, spring 94 is further tensioned so that when the knife is released, it is driven downward past the normal position in which it is shown in Fig. 3 and coöperates with fixed blade 86 to shear off the paper web projecting beyond said fixed blade. Knife 87 has an additional bearing 98 at its heel, which is also engaged by the spring 94 when the knife is in normal position, whereby the knife is held elevated and the shearing device is opened to permit the paper to feed through under the action of the chains 78. The inertia of this knife, however, drives it past the normal position when it executes its stroke, causing a re-action in spring 94 immediately after which the pressure of the spring upon the heel of the knife restores the knife to normal position. Shaft 92 upon which the disk 91 is mounted, is driven through beveled pinion 99, from a beveled pinion 100 on the shaft 55. Inasmuch as beveled pinions 99 and 100 are of equal dimension, there is one stroke of the severing knife for each revolution of the shaft 55, which, it has been seen, effects the printing and delivery of sufficient paper to make up a complete article sold.

It will be seen that while the printing and delivery of the article to be sold (insurance policy or the like) is under the control of the purchaser and actuated by power furnished by him, it is therefore necessarily a relatively slow operation. The printing stroke is developed from the power thus furnished independently of said movement; and the action by which the printing wheels are set so as to express the time and date, are actuated by a spring motor of considerable power and quick action, and which operation is in turn controlled, not directly by a time mechanism which would be slow in effecting the releasing movement, but indirectly through a spring or gravity actuated drop bar which acts instantaneously each time the clock mechanism advances a predetermined period, (viz. five minutes in the machine used for illustration). The result of this is that while there may be overlapping of the printing stroke and the shifting stroke, in point of time, or while the shifting stroke may take place, or while a purchaser is at the machine, there can be no material interference of the functions owing to the substantially instantaneous action of those parts which are not subject to the will of the operator.

*Driving motors.*—It has already been seen that the timing and dating portions of the recording mechanism are driven by separate spring motors. Inasmuch as the duty imposed upon these motors is a known quantity and commensurate merely with the lapse of time, these motors can readily be designed to insure operation of the machine for any reasonable predetermined period, say, for one week or eight days. These motors are respectively wound from the arbors 101 and 102. But the motor for operating the printing, delivering and severing mechanism must perform a duty which cannot be calculated in advance, as it is commensurate with the amount of business done by the machine; hence it is desirable to have these parts driven, not by a motor of limited capacity, but by automatic means of indefinite capacity. For this purpose, the pinion 56, which drives the shaft 55, is in gear with a pinion 103, which receives an actuating hook 104 that is to be connected with a platform upon which the purchaser stands. Hook 104 engages the wheel 103 through pins 105 of which there are five provided on said wheel, so that wheel 103 moves one-fifth of a revolution each time a purchaser stands upon a platform and this, by proper calculation, imparts one revolution to the shaft 55.

Figure 17:
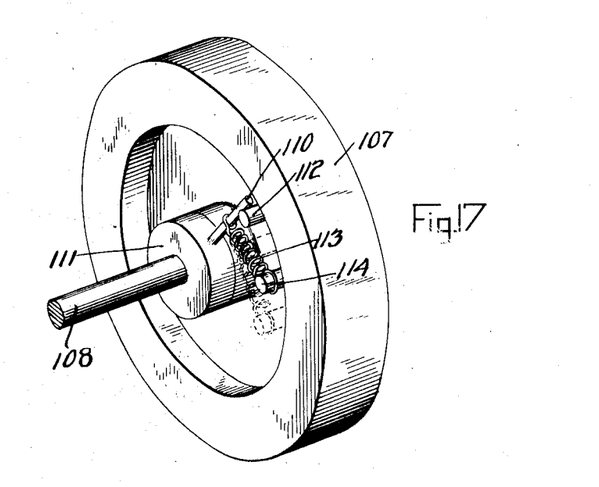
Fig. 17 is a detail view of the inertia wheel employed in each of the spring motors, and its resilient connection with the shaft through which it loads the driving spring to prevent shock on the timing mechanism when the latter are released.
Figure 18:
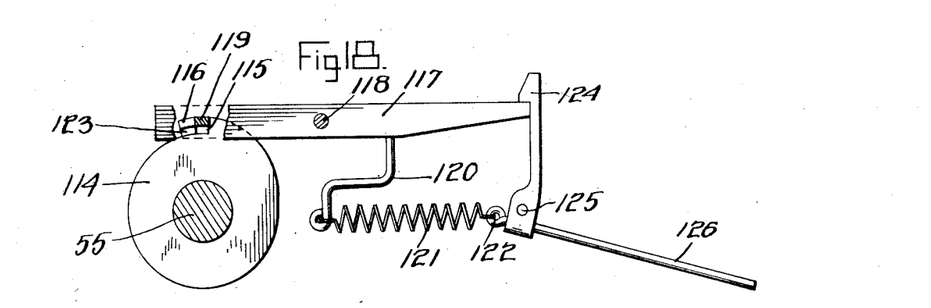
Figs. 18 and 19 are detail views of the coin released detent for the delivery mechanism.
Figure 19:
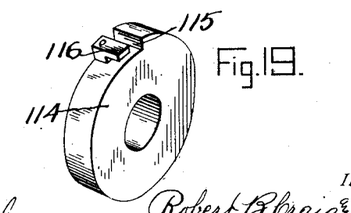

It is desirable to so load the spring motors which drive the date and time recording means as to prevent too sudden impulses in the driven mechanism. For this purpose, inertia wheels 106 and 107 are provided on shafts geared to said motors. The construction and effect of these inertia wheels will be understood upon reference to Fig. 17, which shows the wheel 107 mounted upon the shaft 108 that is connected through gear 109 with the gear 45 of the spring motor 46 (see Fig. 5). These inertia wheels are loose upon the shafts upon which they are mounted and are prevented from relative rotation in one direction by intersecting pin 110 projecting from a hub 111 on the shaft to be retarded, and a pin 112 projecting from the inner face of the wheel. These pins are held in contact by a spring 113 extending from pin 110 to a post 114 on the wheel 107. When shaft 108 is rotated by its spring motor in the direction that drives pin 110 against pin 112 the entire inertia of wheel 107 must be overcome. But when the mechanism is brought to an abrupt stop by the escapement which controls the first wheel of the series of recording wheels being driven, spring 113 yields to permit limited continued rotation in the wheel 107, and thus the work stored up in the wheel is gradually overcome and shock upon the parts is avoided.

*Coin controlled means.*—Shaft 55 carries a cam disk 114 provided with a shoulder 115 and a coöperating stop 116. A lever 117 fulcrumed at 118, carries a pin 119 that normally lies between shoulder 115 and stop 116. An arm 120 on lever 117 is connected by spring 121 to an anchorage 122, that lever 117 tends to swing in a direction to depress its pin 119. Stop 116 is recessed at 123 so that when pin 119 is depressed, it may pass through the recess 123 and permit cam disk 114, and, therefore, the shaft 55, to rotate. The opposite end of lever 117 is engaged and held by a detent 124 pivoted at 125 through the medium of the spring 121. An arm 126 extending from the detent 124 on the opposite side of its fulcrum 125 projects into the path of a coin in the coin chute 127 (see Fig. 1). When a purchaser stands upon a depressible platform and a portion of his weight is transmitted through the hook 104 to the wheel 103, the latter tends to rotate under the load, but is restrained by wheel 56 whose shaft 55 is locked by the pin 119 on the lever 117. But upon inserting the coin in the chute 127, and striking the arm 126, detent 124 is rocked upon its fulcrum 125 to release the lever 117 whose rear end then drops under the influence of spring 121 to bring pin 119 opposite recess 123 so that cam disk 114 and the shaft 55 may rotate under the driving load imposed upon it. Rotation of shaft 55 feeds the paper, imparts a double impress to the printing impulse and actuates the severing device, as described. In rotating, cam disk 114 gradually raises pin 119 and through it the lever 117, in opposition to spring 121 until the forward end of said lever passes below the shoulder on detent 124 and permits the latter to return to engaging position. As pin 119 passes the salient point of the cam, it drops into the space between shoulder 115 and stop 116, where it is held by the engagement of the lever with the detent 124 and the machine is then inoperative until another coin is inserted in the coin chute.

Figure 6:
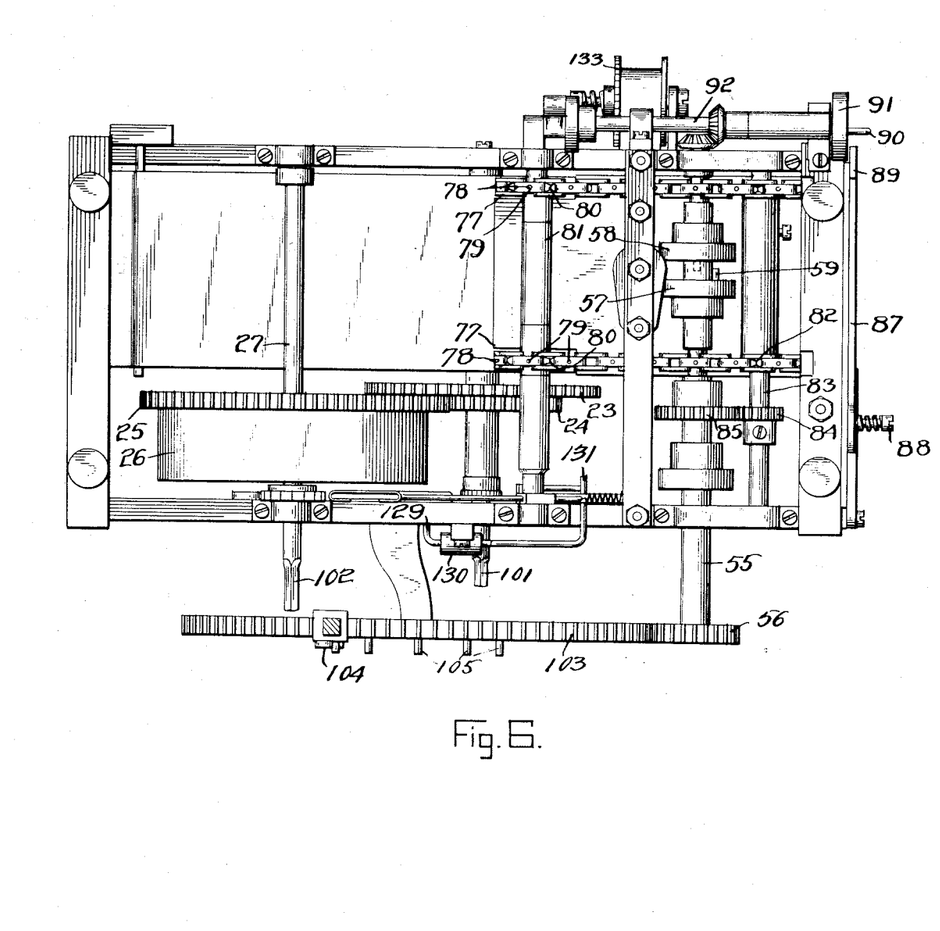
Fig. 6 is a bottom view.

*Coin receptacle.*—This feature of the invention may be of any well known construction; it is, however, provided with a barrier 128 carried by a staff 129 which is fulcrumed at 130 and extends thence transversely to the plane of its fulcrum to provide a lever end 131, as shown in Figs. 1, 4 and 6. This lever end projects beneath lever 117, so that when said lever 117 is in normal position, barrier 128 is held out of the path of the coin in the chute 127; but when detent 124 is released by a coin and forward end of lever 117 rises, barrier 128 projects across the path of the coin and no further coin can be introduced until the machine has completed its operation and been restored to operative condition. Inasmuch as the introduction of a coin necessarily releases the lever 117 regardless of subsequent operation of the machine, it follows that if the machine should become inoperative from any cause, only a single coin will be received.

Figure 7:
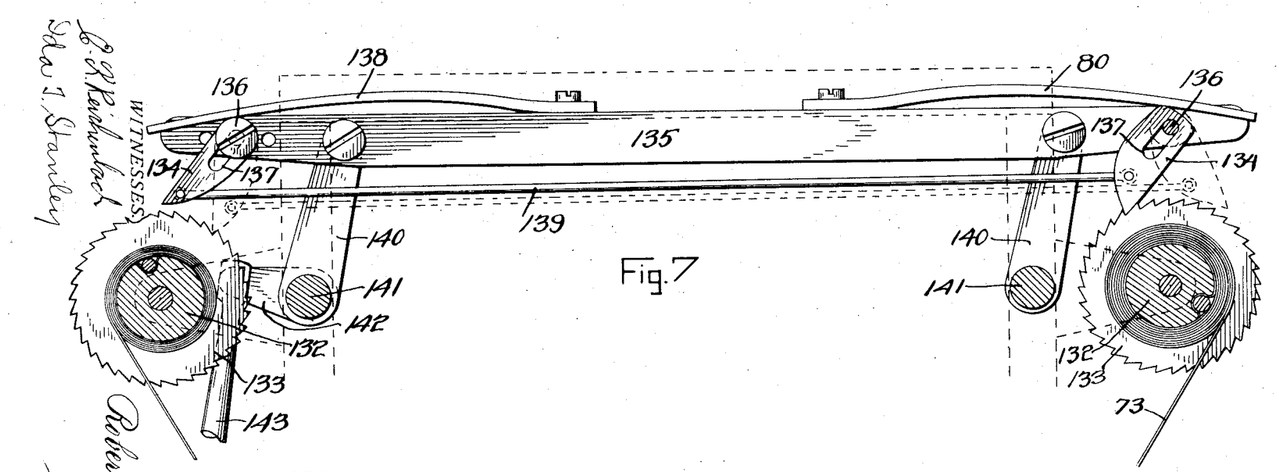
Figs. 7 and 8 are respectively a front view and a plan view of the automatically reversing feed mechanism for the inking ribbon of the printing device.
Figure 8:
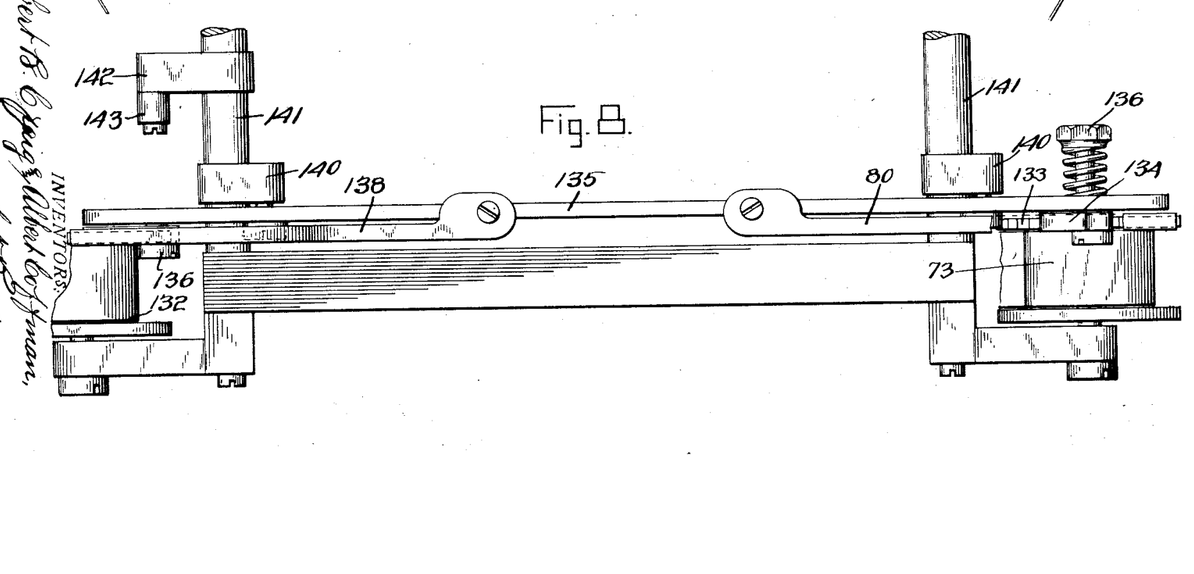

*Ribbon feed mechanism.*—While any suitable form of inking device may be employed for the printing characters, it is preferred to employ an inking ribbon together with the following instrumentality for feeding the ribbon step by step at each impression of the machine and for automatically reversing the direction of feed whenever the ribbon reaches the end of its travel in either direction. Referring to Figs. 7 and 8, ribbon 73 is wound upon a pair of bobbins 132 provided with ratchets 133 which receive the pawls 134 on a horizontal reciprocating bar 135. Pawls 134 are pivoted upon screws 136 through the medium of slots 137 that permit the pawls to rise upon their pivot screws. They are held normally downward by springs 138 and 80. A coupling rod 139 connects the pawls and spaces their free ends at such distance that when either pawl is in driving relation to its ratchet, the other pawl is in idle relation to its ratchet, so that the active pawl will drive and wind the ribbon upon the bobbin being driven, while the idling pawl will drag over its ratchet and permit the ribbon to unwind from the bobbin controlled thereby. The angle of a pawl relatively to the reciprocating bar 135 when the pawl is in driving position, is such that the thrust upon the pawl is approximately in the line of the slot through which the pawl is fitted to its pivot pin. From this circumstance, it results that when the ribbon is wholly unwound from the bobbin opposite to that upon which it is being wound, and its end is anchored fast to the empty bobbin, the resistance of the engaged ratchet causes the pawl to rise up relatively to its pin 136 and rock over and change its angular position relatively to the ratchet. Inasmuch as it is connected to the pawl that was idling up to this point, it shifts the angle of the latter, also, whereupon the previously acting pawl becomes the idling pawl and that which was previously inactive now assumes driving relation to its own ratchet and the winding of the ribbon is reversed. The bar 135 is reciprocated by mounting it upon a pair of parallel arms 140 projecting from rock-shafts 141, one of which has an arm 142 connected by a pitman 143 with a crank disk 144 (Fig. 2) upon the shaft 92, which, it has already been seen, executes a revolution at each operation of the machine. In this way, the ribbon is fed one step at each operation of the machine.

Having thus described our invention, what we claim as new therein and desire to secure by Letters Patent is:—

1. In a time recording mechanism, the combination of a character element carrying characters expressive of time, a driving element normally tending to move said element, a restraining member normally preventing the movement of said character element by said driving element, means constantly tending to move said restraining member to releasing position to permit the driving element to act, and a timing element normally resisting the releasing movement of said restraining member but periodically releasing said restraining member, and receiving its own driving power through the force which it restrains.

2. In a time recording mechanism, the combination of character elements carrying characters expressive of time, a driving element normally tending to move said character elements, a member engaging with and restraining the character elements, a timing element; and a means carried by the restraining member and connected to the timing element, said means effecting the actuation of said timing element and the releasing movement of the restraining member.

3. In a time recording mechanism, the combination of character elements carrying characters expressive of time, a motor normally tending to move said character elements and a timing element normally restraining said character elements but releasing the same at predetermined intervals of time; said timing element being provided with a fixed member, a free member intermittently engaging therewith and through the medium of which it restrains the character element, and through which the timing element is actuated, an accelerating spring connected between the free member and the timing element, and means for maintaining the tension of the spring during the interval of release.

4. In a time recording mechanism, the combination of a character element carrying characters expressive of time, a driving element normally tending to move said character element, an escapement normally restraining the character element against movement, a timing element, a drop bar supported by and adapted to move the escapement in the direction of release, a timing element adapted to withhold the drop bar and release the same at predetermined intervals, and said escapement being constructed to restore the connection between the drop bar and the timing element.

5. In a time recording mechanism, the combination of character elements carrying characters expressive of time, a driving element normally tending to move said character element and a timing element normally restraining said character element but releasing it at predetermined intervals of time; said timing element being provided with a spring, through the medium of which it restrains the character element, and through which it is actuated by the load imposed upon it in resisting movement of the character element; said spring being connected between the point of release and the timing element, and means being provided for maintaining the tension of the spring during the interval of release.

6. The combination of the character element, the escapement controlling the character element, the drop bar adapted to move the escapement in the direction of release, and a timing element normally supporting the drop bar, but releasing the same at predetermined intervals; said escapement being constructed to positively move the drop bar in the direction opposite to the direction of release and thereby return said drop bar to position for engagement with the timing element.

7. The combination of a time piece, a toothed wheel rotated by said time piece, a connecting bar supported by said toothed wheel and normally tending to move as said toothed wheel rotates, and a recording means controlled by said bar, said recording means adapted to effect the replacing of the bar through its operation.

8. The combination of a time piece having a toothed wheel, a drop bar engaging with and supported upon said toothed wheel but released therefrom at predetermined intervals, and a recording mechanism controlled by said drop bar, said recording means effecting to lift the bar to position on said toothed wheel through the operation of said recording means.

9. The combination of the time piece having a toothed wheel, a drop bar supported by said toothed wheel, the guide through which said drop bar works, and the recording means controlled by said drop bar; said drop bar and guide being constructed to permit lateral relative movement between them when the drop bar reaches the point of release from the toothed wheel.

10. The combination of the time piece having a toothed wheel, a drop bar supported by said toothed wheel, the guide through which said drop bar works, and the recording means controlled by said drop bar; said drop bar and guide being constructed to permit lateral relative movement between them when the drop bar reaches the point of release from the toothed wheel; and said guide being provided with a yielding wall that also permits lateral relative movement between the drop bar and its guide as the drop bar moves into engagement with a succeeding tooth of the wheel.

11. The combination of the time piece having a toothed wheel, a drop bar supported by said toothed wheel, the guide through which said drop bar works, and the recording means controlled by said drop bar; said drop bar and guide being constructed to permit lateral relative movement between them when the drop bar reaches the point of release from the toothed wheel; and said guide being provided with a yielding wall that also permits lateral relative movement between the drop bar and its guide as the drop bar moves into engagement with a succeeding tooth of the wheel; said yielding wall being provided by a pivoted chock, normally assuming a position to confine the drop bar laterally, but swinging upward by the engagement of the drop bar when the latter returns from its releasing movement.

12. In a recording apparatus, the combination of a character wheel, an escapement restraining the character wheel, means controlling the escapement, and a motor for the character wheel normally tending to rotate said wheel; said motor being provided with an inertia body normally opposing movement to be transmitted from the motor to the character wheel.

13. In a recording apparatus, the combination of a character wheel, an escapement restraining the character wheel, means controlling the escapement, and a motor for the character wheel normally tending to rotate said wheel; said motor being provided with an inertia body normally opposing movement to be transmitted from the motor to the character wheel, through the medium of rigid abutments, but having resilient connection through which the inertia wheel is restrained from rotation.

14. In a recording mechanism, the combination of a character element provided with printing characters expressive of time, printing means adapted to make an impression from said timing characters, and independent motors for the character element and printing means; the motor for driving the character element being constructed to store power and the motor for operating the printing means being actuated manually by the operator.

15. In a recording mechanism, the combination of a character element provided with printing characters expressive of time, printing means adapted to make an impression from said timing characters, and independent motors for the character element and printing means; the motor for driving the character element being constructed to store power and the motor for operating the printing means being actuated at the will of the operator; said character element motor having a suitable timing mechanism which permits it to operate at predetermined intervals.

16. In a time recording apparatus, the combination of a dating mechanism, a time recording mechanism, independent motors for the dating and time recording mechanisms, means through which the time recording mechanism controls the dating mechanism, a timing element, and a means for actuating the timing element and controlling the time recording mechanism.

17. In a time recording apparatus, the combination of dating mechanism, time recording mechanism, independent motors for the said mechanisms, a printing mechanism, a motor adapted to be actuated by an operator for actuating the printing mechanism, a timing element, and a means for actuating the timing element and controlling the time recording mechanism.

18. In recording mechanism, comprising a plurality of rotary disks having characters adapted to collectively indicate, means whereby one rotary member controls another consisting of a stop arresting the movement of the member to be controlled, a lever having a lifting dog for engaging and moving the member to be controlled, and a projection on the member from which the control is exercised adapted to remove the stop and engage with and trip said lever to raise the lifting dog.

19. In automatic vending machines having printing and delivery mechanism, means for actuating said printing and delivery mechanism, adapted to be operated by a purchaser, means for shifting the printing members to express different times of sale, a spring motor adapted to impart substantially instantaneous adjusting movement to the printing members, a time mechanism, and means having its own actuating power adapted to be released by the time mechanism and adapted in turn to release the motor of the printing members.

20. In a time recording mechanism, the combination of character elements carrying characters expressive of time, a driving element normally tending to move said character elements, a timing element normally restraining said character elements but adapted to release the same at predetermined intervals of time, printing mechanism coöperating with said character elements, paper feeding mechanism, and a severing device operable through said paper feeding mechanism.

21. In a time recording mechanism, the combination of character elements carrying characters expressive of time, a driving element normally tending to move said character elements, a timing element normally restraining said character elements but releasing the same at predetermined intervals of time, a printing mechanism, a motor actuated by the presence of an operator for actuating the printing mechanism, paper feeding mechanism, and a severing device actuated through said motor.

22. In a time recording mechanism, the combination of character elements carrying characters expressive of time, a driving element normally tending to move said character elements, a timing element normally restraining said character elements but releasing the same at predetermined intervals of time, a printing mechanism coöperating with said character elements, a motor, paper feeding mechanism, and a severing device, said motor, paper feeding mechanism and severing device adapted to be actuated by the presence of an operator.

23. In a coin controlled vending machine having mechanism for recording the time of sale, the combination of means for actuating said mechanism, independent means normally restraining the recording actuating mechanism and permitting it actuation at predetermined intervals, and printing and delivery mechanism operable independently of the aforesaid means.

24. In a coin controlled vending machine having mechanism for recording the time of sale, the combination of means for actuating said mechanism, independent means normally restraining the recording actuating mechanism and permitting it actuation at predetermined intervals, and printing and delivery mechanism operable through the weight of the purchaser.

25. In a coin controlled vending machine having mechanism for recording the time of sale, the combination of means for actuating said mechanism, a timing mechanism, a connection between the recording and timing mechanisms adapted to control the operation of the former and effect the actuation of the latter, and independently operable printing and delivery mechanisms.

The foregoing specification signed at Kansas City, Missouri, this 21st day of September, 1908.

ROBERT B. CRAIG.
ALBERT COFFMAN.

In presence of two witnesses:
V. HUNDLEY,
W. IRVING LAKE.